United States Patent [19]

Yeadon et al.

[11] 3,859,121

[45] Jan. 7, 1975

[54] FORMULATIONS FOR PREPARING LONG LASTING INSECT REPELLENT FINISHES FOR TEXTILE FABRICS

[75] Inventors: David A. Yeadon; Gary F. Danna, both of Orleans; Albert S. Cooper, Jr., Metairie, all of La.

[73] Assignee: The United States of America as represented by the Secretary of Agriculture, Washington, D.C.

[22] Filed: Dec. 7, 1973

[21] Appl. No.: 423,047

Related U.S. Application Data

[63] Continuation of Ser. No. 104,763, Jan. 7, 1971, abandoned.

[52] U.S. Cl. .........117/138.5, 424/306, 424/DIG. 10
[51] Int. Cl. ............................................. A61l 13/00
[58] Field of Search ............. 424/DIG. 10, 314, 318, 424/341, 45, 306; 167/42, 117/138.5

[56] References Cited

UNITED STATES PATENTS

| | | | |
|---|---|---|---|
| 2,967,798 | 1/1961 | Bruce | 424/341 |
| 3,265,568 | 8/1966 | Salveson | 424/45 |
| 3,492,402 | 1/1970 | Baker | 424/341 X |

OTHER PUBLICATIONS

Smith et al., J. Econ. Ent. (1949), Vol. 42, No. 3, pp. 439–444.

Gregory, Uses and Applications of Chemicals and Related Materials, 1939, pp. 158 and 159.

Chemical Abstracts, Vol. 57, 1962, p. 3528g.

*Primary Examiner*—William E. Schulz
*Attorney, Agent, or Firm*—M. Howard Silverstein; Max D. Hensley

[57] ABSTRACT

Textiles are impregnated with insect repellent compositions including piperonyl butoxide and pyrethrin, wetting agent, thickener and an agent for preventing migration of the pyrethrin and piperonyl butoxide repellent into foods stored in contact with the textiles and for otherwise retaining the repellent in the textiles. Suitable agents were found to be ethylene glycol monoricinoleate, pentaerythritol monoricinoleate, water soluble polyalkylene glycol, polypropylene triol of average molecular weight 700, ricinoleyl ricinoleate, corn oil, tung oil, linseed oil, oleic acid, linoleic acid dimer, polypropylene pentol of average molecular weight 400, and linoleic acid trimer.

5 Claims, No Drawings

FORMULATIONS FOR PREPARING LONG LASTING INSECT REPELLENT FINISHES FOR TEXTILE FABRICS

A non-exclusive, irrevocable, royalty-free license in the invention herein described, throughout the world for all purposes of the United States Government, with the power to grant sublicenses for such purposes, is hereby granted to the Government of the United States of America.

This is a continuation of Ser. No. 104,763, filed Jan. 7, 1971 and abandoned.

This invention relates to insect repellent finishing of cotton textile fabrics. More particularly this invention relates to an insect repellent finish which will provide for increased retention of the insect repellent in the treated cotton fabric. In addition this invention provides an insect repellent treated finish for cotton textiles which reduces the extent of migration of the insecticide from the treated fabric to food stuff stored in contact with said treated materials.

One reason insect repellent treatments are applied to cotton fabrics, textiles, and packaging materials is to fabricate from the treated materials insect-resistant bags for the storage and transport of foods and feed. Such applications require that insecticides employed are approved by the Food and Drug Administration for use with foods. One of the more common insecticidal preparations used for such purposes which is approved by the Food and Drug Administration is pyrethrins synergized with piperonyl butoxide. Pyrethrins which are identified and knonw in the art principally as Pyrethrin I and Pyrethrin II, and related compounds are usually obtained by extraction of pyrethrin flowers (*Chrysanthemum cinerariaefolium*) with solvents such as kerosene or alcohol, or may be synthesized chemically. These compounds are viscous liquid esters insoluble in water but soluble in various organic solvents, and are insecticidally active. However, when certain other compounds which may not be insecticidally active are mixed with the pyrethrins, greater insecticidal activity is sometimes observed for the mixture through a synergistic effect. One such synergist for pyrethrins is the compound piperonyl butoxide, which can be synthesized chemically and which enhances the insecticidal activity of the pyrethrins. The advantage of using a synergist is that the pyrethrins are more costly than the synergist and by such a combination a less expensive insecticidally active preparation can be had with an insecticidal activity several times that of the pyrethrins alone. The presence of these insecticidal substances in or on the packaging materials, such as cotton fabric textiles, imparts insect repellent properties to such packages.

Although these particular insecticidal compounds boil at elevated temperatures they still possess sufficient volatility to permit them to very slowly evaporate or leave from the IRT bag materials during storage or shipment of lengthy periods, thereby causing the treated storage material to provide reduced insect repellency.

It is a primary object of this invention to provide an insect repellent finish which will remain for a greater period of time on textile materials on which they have been applied, specifically on cotton textile packaging fabrics.

A secondary object of this invention is to reduce contamination of the stored foods and feed, with the insecticidal components of the IR-finished package when the food products are in contact with such treated materials. Other objects may be apparent as the invention is disclosed.

The pyrethrin/piperonyl butoxide insecticide components applied in appropriate concentrations from a water emulsion preparation of a petroleum distillate solution of the insecticides, or from the petroleum distillate solution itself, to packaging materials and fabrics imparts insect repellency to bags fabricated from these treated materials useful for the storage and transportation of foodstuffs. However, due to the volatility of the insecticide compounds there is generally a gradual diminishing of the insect repellency of the treated package. Application of greater concentrations to allow the residual insecticide to be present at a sufficient level to retain suitable insect repellency is not feasible since such higher concentrations are not permissible under present FDA regulations which limit the insecticide concentration on the fabrics to about 5.5 mg/sq ft of pyrethrins and 55 mg/sq ft of piperonyl butoxide, respectively, as indicated in the Federal Register 33(89), 6867–6868 (May 7, 1968).

With somewhat less flexible packaging materials such as paper, nonwoven fabrics and certain other textiles, impregnation of the pores with some inert material such as clay, talc, silica, etc. acts as an adsorbent which can retard the loss of the insecticidal components. Since it is not practical with softer and more flexible packaging materials, such as cotton sheeting, woven textiles, etc. to fill the pores with such inert substances, higher boiling, low volatile ingredients such as waxes, petroleum oils, etc. have been incorporated into insecticidal formulations in some instances, as in U.S. Pat. No. 3,265,568 (Aug. 9, 1966). By affording a very low volatile media which dissolves the insecticides these additives somewhat reduce loss of the insecticide from the treated surfaces. This prsent invention is directed at greater reduction of the loss of applied insecticide from treated textile fabrics by the use of other unique ingredients that have an affinity for the insecticides applied to the fabrics.

The insect repellent treatment of textile fabrics or other sheeting materials suitable for packaging applications is usually accomplished through techniques or processes known in the textile finishing industry as padding or dipping, coating or spraying. In the finishing of textiles and fabrics most production operations favor the use of aqueous based systems for reasons of safety to minimize health and fire hazards. Accordingly, insect repellent treating formulations ar customarily prepared by water emulsification of a high boiling petroleum distillate solution of the insecticidal components such as the synergized pyrethrin/piperonyl butoxide preparations. Emulsifiers may be contained in the petroleum distillate solution of the insecticide or added as desired, and viscosity adjusting agents or thickening agents can be incorporated as required for padding, coating, or spraying application processes of the formulations. The petroleum distillate solution generally contains the pyrethrin and piperonyl butoxide insecticide components in a 1 to 10 weight ratio, being usually in the range of about 1.2 and 12.0 percent to about 5.0 and 50.0 percent of these components, respectively. The concentration of the insecticides in the emulsion treating formulation is chosen such that at a desired wet pickup of the formulation on the fabric, which is generally in a range of about 30 to 120 weight percent, there will be deposited on the fabric after such treatment an insecticide concentration of about 5 mg and 50 mg/sq ft of the pyrethrin and piperonyl butoxide components respectively. The concentration of the insecticides in the treated fabrics and food stuffs are determined by a procedure as described in Pesticide Residues Methods Pr 4e-61 of the Stored-Product Insects Research and Development Laboratory of the Agricultural Research Service of the United States Department of Agriculture and also the Tannic Acid method of the Association of Official Agricultural Chemists and as set forth in Mil. Spec. I-21330-B. In these analyses only the piperonyl butoxide contents are determined, but since the treatment formulations contained pyrethrins and piperonyl butoxide in a 1 to 10 ratio it is considered that the pyrethrin concentration in the samples analyzed are one-tenth that of the piperonyl butoxide concentrations found.

We have discovered that if certain organic compounds which contain either hydroxy, olefinic, or ester groupings selected from the group of compounds consisting of water soluble polyalkylene glycol, polypropylene triol of average molecular weight 700, polypropylene pentol of average molecular weight 400, ethylene glycol monoricinoleate, pentaerythritol monoricinoleate, ricinoleyl ricinoleate, corn oil, linseed oil, tung oil, oleic oil, linoleic acid dimer and linoleic acid trimer, are incorporated into the insect repellent formulations applied to textile fabrics, that the resultant insect repellent treatments are retained on the treated fabrics significantly longer than when these aforementioned components are not present. These organic compounds thus serve as antimigrating agents for the pyrethrin-piperonyl butoxide formulations. Of course, they are applied in effective antimigrating concentrations, which depend upon the particular compound employed and the effectiveness desired. Retention of the insecticide on the treated packaging fabric fosters extended effectiveness of the insect repellent life of packaging containers fabricated from such treated fabrics and reduces contamination of the container contents.

We have observed that on exposing an insect repellent treated cotton fabric in a forced draft oven held at 50°C, in an accelerated test to simulated prolonged exposure, that the original insecticide concentration level of 5.6 mg/sq ft pyrethrins and 56.0 mg/sq ft piperonyl butoxide was reduced to 55 percent of this value after 5 days exposure, and only 35 percent after 8 days. When a modified treating formulation containing a petroleum wax in water emulsion was applied to the fabric the IRT fabric containing 4.6 mg/sq ft pyrethrins and 46.0 mg/sq ft piperonyl butoxide and about 340 mg/sq ft of wax indicated 60 percent retention of the insecticide after a 5 day period in the above accelerated test. However, when we modified the insect repellent treating formulation to contain a higher boiling hydroxy, unsaturated and ester group containing compound, such as castor oil, so that about 500 mg/sq ft castor oil was deposited on the fabric while effecting a 6.1/61 mg/sq ft of pyrethrin/piperonyl butoxide treatment, the resultant IRT-fabric when exposed in the 50°C oven for 8 days retained 75 percent of the original insecticide content.

Similarly we have discovered that other hydroxy containing substances when incorporated into insect repellent emulsion formulations and applied onto textile fabrics exhibit the ability to retard the loss of the insecticide from the treated fabrics in the accelerated 50°C oven test as follows: polyalkylene glycol textile lubricant (viscosity 56.2 centistokes at 100°F) retained 87 percent; polypropylene triol (av. mol. wt. of 700, av. OH No. 238 mg KOH/g) retained 79 percent; polypropylene pentol (av. mol. wt. of 400, av. hydroxyl no. of 490 mg KOH/g) 72 percent; ethylene glycol monoricinoleate retained 83 percent; pentaerythritol monoricinoleate retained 80 percent; ricinoleyl ricinoleate retained 81 percent; and others.

Although the true manner is not understood by which such hydroxy containing substances are capable of promoting this desirable effect of retarding the loss of the insecticide components from the IRT-fabrics and thereby (potentially) extending the insect repellent life of IRT-bags made from such fabrics, in addition to the property of low volatile, higher boiling substances to solubilize and retain the insecticide components, these hydroxy containing substances may be capable of attracting and holding the insecticide compounds through their ability to form hydrogen bonds with the oxygen moities like those of the insecticide compounds. The occurrence of hydrogen bonding in many compounds is known to significantly lower the vapor pressure and reduce volatility, is the dominant factor in the attraction between many large molecules, is responsible for the attraction for water in substances and in water of crystallization formations, as well as in remarkable changes in solubility characteristics of substances in which such bonding is present.

It has also been our discovery that certain other substances containing olefinic and ester groupings, such as found in vegetable oils, when incorporated in insect repellent formulations have likewise displayed the ability to cause the insecticide to be retained on IRT-fabrics longer than that observed for those fabrics treated with IRT-formulations containing the pyrethrin/piperonyl butoxide alone without the presence of these substances.

Whereas the IRT-fabric containing no insect repellent loss retarder retained 35 percent of the insecticide after exposure in a 50°C forced draft oven for 8 days, IRT-fabric treated with a formulation containing corn oil in sufficient concentration to deposit about 500 mg/sq ft of the corn oil on the fabric while treating the fabric to an insecticide level of about 6 mg and 60 mg/sq ft of pyrethrins and piperonyl butoxide, respectively, showed 60 percent of the insecticide remained after a similar eight days in the 50°C oven test. Other IRT-fabrics prepared with formulations containing other vegetable oil components likewise exhibited retardation of insecticide loss from the treated fabrics as follows: blown castor oil, 50 percent retained after 10 days; bodied linseed oil, 61 percent retained after 8 days; tung oil, 51 percent retained after 8 days; and others.

In this invention we have found that the benefits pursuant to the use of these hydroxy, unsaturated, and/or ester containing substances to retard the loss of insecticide from insect repellent treated fabrics have been achieved through padding or scrape coating application of a water emulsion formulation containing the insect repellent and loss inhibitor components. This does not exclude other means of application, such as curtain, kiss-roll, and other type coatings or spraying of such insect repellent formulations, or other formulation preparations in suitable solvents or by other conceivable systems.

Although we have found that insect repellent treated fabrics whch exhibit the property of retaining the insect repellent components for longer periods of time can be prepared by applying insect repellent formulations prepared from about 1.0 to 10 percent of a petroleum distillate solution containing from 1.2 to 5.0 percent pyrethrins, 12.0 to 50.0 percent piperonyl butoxide and 12.0 to 20 percent of an emulsifying agent such as polyoxyethylene sorbitol esters of mixed fatty acids, about 70 to 95 percent of a 0.2 to 2.0 percent aqueous hydroxyethyl cellulose thickener solution, and 0 to 0.5 percent of a non-ionic alkylaryl polyether alcohol wetting agent, with about 1 to 14 percent of certain hydroxy, olefinic or ester containing organic materials, or 35 to 70 percent solids aqueous polymeric latex emulsions, we prefer to use insect repellent treating formulations consisting of 4.0 percent of the petroleum distillate solution having 1.2 percent pyrethrins, 12.0 percent piperonyl butoxide, and 15 percent of the polyoxyethylene sorbitol esters of mixed fatty acids emulsifying agent, 89.9 percent of a 0.5 percent hydroxyethylcellulose solution, 0.1 percent of the non-ionic wetting agent such as Triton X-100, with 6 percent of a hydroxy, unsaturated, ester component such as castor oil, polyalkylene glycol textile lubricants, such as UCON 50-HB—260, or unsaturated vegetable oils such as corn, tung, or linseed oils. These formulations are applied by techniques as previously mentioned, such as knife or scrape coating, padding or spraying to the extent of about a 30 to 120 weight percent wet pickup on the textile fabric so as to deposit the insect repellent at a concentration level of 5 ± 0.5 mg/sq ft of pyrethrins and 50 ± 10 mg/sq ft of piperonyl butoxide along with about 200 to 850 mg/sq ft (3 to 5 percent by weight on the fabric) of the insecticide loss retarding component on the textile fabric.

For applications by scrape coating techniques we prefer to use the more viscous insect repellent formulations containing about 1 to 2 percent hydroxyethyl cellulose thickner solution, whereas for padding, spraying, or roller coating application techniques the more fluid IR-formulations containing generally less than 1 percent hydroxyethyl cellulose solutions are employed.

For treating the fabrics with the IR-formulations containing the aqueous polymeric latex emulsion preparations as components to retard loss of insecticide from the treated fabrics we prefer to use insect repellent treating formulations consisting of about 10.0 percent of the petroleum distillate solution having 1.2 percent pyrethrins, 12.0 percent piperonyl butoxide, and 15 percent of the polyoxyethylene sorbitol esters of mixed fatty acids emulsifying agent, 37 percent of a 2.0 percent hydroxyethyl cellulose solution, 0.1 percent of the alkylaryl polyether alcohol non-ionic wetting agent, with 53 percent of the aqueous polymeric latex emulsion preparations, such as (polyvinyl acetate), (acrylic), (vinylvinylidene chloride), (styrene butadiene), (vinyl chloride), or (polyvinyl butyral). These formulations are applied by the techniques as previously mentioned to the extent of about 30 to 80 weight percent wet pickup on the textile fabric so as to deposit the insect repellent at a concentration level of about 10 mg/sq ft of pyrethrins and 100 mg/sq ft of piperonyl butoxide along with about 1,500 to 2,500 mg/sq ft (10 to 15 percent by weight on the fabric) of the polymeric solids components that exhibits the property of retarding loss of insecticide from the IRT-textile fabric.

Although the above are here specified this does not exclude use of other formulations with the proportions of ingredients adjusted to permit other weight pickups which would allow desired levels of deposits of the IR-formulations components, but would be more adaptable to particular processing conditions or requirements.

The following examples illustrate some of the details of this invention.

Example 1

Ordinary Insect Repellent Treating Formulation (Unsatisfactory)

An insect repellent emulsion formulation, prepared by rapidly mixing 3.34 parts of Pyronyl 101 Emulsion Concentrate (1.2 percent pyrethrins, 12.0 percent piperonyl butoxide and 15 percent polyoxyethylene sorbitol esters of mixed fatty acids emulsifier) and 48.66 parts of an aqueous 1 percent hydroxyethyl cellulose solution, was used to treat 48 × 48 greige cotton sheeting at a wet pickup of 38 percent. After drying the treated fabric was found to contain by analysis 56 mg/sq ft of piperonyl butoxide. A sample of this treated fabric after exposure in a 50°C forced draft oven was found to contain 55 percent of the original piperonyl butoxide after 5 days and only 35 percent after 8 days (see Table I).

TABLE I

RETENTION OF PIPERONYL BUTOXIDE IN COTTON FABRIC TREATED WITH INSECT REPELLENT FORMULATIONS CONTAINING COMPONENTS TO RETARD LOSS AND MIGRATION OF INSECTICIDE AFTER EXPOSURE IN 50°C FORCED DRAFT OVEN

| Component to inhibit IR-Loss | | Piperonyl Butoxide Content of Fabric | | | |
|---|---|---|---|---|---|
| Name | Concentration on Treated Fabric | Original Content of IRT-Fabric | % Remaining After 50°C Exposure for | | |
| | | | 5 days | 7–8 days | 10 days |
| | t.% — mg/sq ft | mg/sq ft | | | |
| None (control) | 0 — 0 | 56 | 55 | 35 | 25 |
| Wax (Mobilcer HM) | 2.4 — 385 | 46 | 60 | — | — |
| Castor Oil | 2.9 — 495 | 61 | 81 | 75 | — |

TABLE I — Continued

RETENTION OF PIPERONYL BUTOXIDE IN COTTON FABRIC TREATED WITH
INSECT REPELLENT FORMULATIONS CONTAINING COMPONENTS TO RETARD
LOSS AND MIGRATION OF INSECTICIDE AFTER EXPOSURE IN 50°C FORCED DRAFT OVEN

| Component to inhibit IR-Loss | | Piperonyl Butoxide Content of Fabric | | | |
|---|---|---|---|---|---|
| Name | Concentration on Treated Fabric | Original Content of IRT-Fabric | % Remaining After 50°C Exposure for | | |
| | | | 5 days | 7–8 days | 10 days |
| Castor Oil | 4.9 | 800 | 60 | 88 | 90 | — |
| Corn Oil | 2.9 | 490 | 59 | 90 | 58 | — |
| Corn Oil | 5.2 | 870 | 61 | 79 | 45 | — |
| Polyalylene glycol Textile Lubricant | 2.7 | 485 | 68 | 88 | 87 | — |

Example 2

Insect Repellent Treating (IRT) Formulation Containing Petroleum Wax

An insect repellent emulsion formulation prepared by rapidly mixing 3.45 parts (6.9 percent) of Pyronyl 101, 5.40 parts (10.8 percent) of petroleum wax emulsion (Mobilcer HM–56 percent solids), and 41.15 parts (82.3 percent) of an aqueous 1 percent hydroxyethyl cellulose solution, was used to treat 48 × 48 greige cotton sheeting at a wet pickup of 39 percent, which deposited about 2.4 percent wax emulsion solids by weight or about 385 mg/sq ft on the fabric. After drying the treated fabric was found to contain 46 mg/sq ft of piperonyl butoxide. A sample of this treated fabric after exposure in a 50°C forced draft oven was found to contain 60 percent of the original piperonyl butoxide after 5 days (see Table I).

Example 3

IRT Formulation Containing Low Concentration of Castor Oil Migration Retarder

An insect repellent emulsion formulation prepared by rapidly mixing 3.34 parts (6.4 percent) of Pyronyl 101, 3.90 parts (7.5 percent) of castor oil and 44.76 parts (86.1 percent) of an aqueous 1 percent hydroxyethyl cellulose solution, was used to treat 48 × 48 greige cotton sheeting at a wet pickup of 39 percent, which deposited about 2.9 percent of castor oil by weight or about 495 mg/sq ft on the fabric. After drying the treated fabric was found to contain 61 mg/sq ft of piperonyl butoxide. A sample of this treated fabric after exposure in a 50°C forced draft oven was found to contain 81 percent of the original piperonyl butoxide content after 5 days and 75 percent after 8 days (see Table I).

Example 4

IRT Formulation Containing High Concentration of Castor Oil Migration Retarder

An insect repellent emulsion formulation prepared by rapidly mixing 3.34 parts (6.4 percent) of Pyronyl 101, 6.50 parts (12.5 percent) of castor oil and 42.16 parts (81.1 percent) of an aqueous 1 percent hydroxyethyl cellulose solution was used to treat 48 × 48 greige cotton sheeting at a wet pickup of 39 percent, which deposited about 4.9 percent castor oil by weight or about 800 mg/sq ft on the fabric. After drying the treated fabric was found to contain 60 mg/sq ft of piperonyl butoxide. A sample of this treated fabric after exposure in a 50°C forced draft oven was found to contain 90 percent of the original piperonyl butoxide content after 8 days (See Table I).

Example 5

IRT Formulation Containing Low Concentration Corn Oil Migration Retarder

An insect repellent emulsion formulation prepared by rapidly mixing 3.34 parts (6.4 percent) of Pyronyl 101, 3.90 parts (7.5 percent) of commercial corn oil and 44.76 parts (86.1 percent) of an aqueous 1 percent hydroxyethyl cellulose solution, was used to treat 48 × 48 greige cotton sheeting at a wet pickup of 39 percent, which deposited about 2.9 percent of corn oil by weight or 490 mg/sq ft on the fabric. After drying the treated fabric was found to contain 59 mg/sq ft of piperonyl butoxide. A sample of this treated fabric after exposure in a 50°C forced draft oven was found to contain 90 percent of the original piperonyl butoxide after 5 days and 58 percent after 8 days (See Table I).

Example 6

IRT Formulation Containing High Concentration Corn Oil Migration Retarder

An insect repellent emulsion formulation prepared by rapidly mixing 3.34 parts (6.4 percent) of Pyronyl 101, 6.50 parts (12.5 percent) of commercial corn oil and 42.16 parts (81.1 percent) of an aqueous 1 percent hydroxyethyl cellulose solution, was used to treat 48 × 48 greige cotton sheeting at a wet pickup of 42 percent, which deposited about 5.2 percent of corn oil by weight or 870 mg/sq ft on the fabric. After drying the treated fabric was found to contain 61 mg/sq ft of piperonyl butoxide. A sample of this treated fabric after exposure in a 50°C forced draft oven was found to contain 79 percent of the original piperonyl butoxide after 5 days and 45 percent after 8 days (see Table I).

Example 7

IRT Formulation Containing Polyalkylene Glycol Migration Retarder.

An insect repellent emulsion formulation prepared by rapidly mixing 3.34 parts (6.4 percent) of Pyronyl 101, 3.90 parts (7.5 percent) of UCON 50-HB—260 polyalkylene glycol textile lubricant and 44.76 parts (86.1 percent) of an aqueous 1 percent hydroxyethyl cellulose solution, was used to treat 48 × 48 greige cotton sheeting at a wet pickup of 37 percent, which deposited about 2.7 percent of the UCON additive by weight or 485 mg/sq ft on the fabric. After drying the treated fabric was found to contain 68 mg/sq ft of piperonyl butoxide. A sample of this treated fabric after exposure in a 50°C forced draft oven was found to contain 87 percent of the original piperonyl butoxide after 7 days (see Table I).

Example 8

IRT Formulations Containing Hydroxy and Ester Anti-Migration Retarders.

Other cotton sheeting fabrics were treated with similarly prepared insect repellent emulsion formulations containing 1 to 7 percent of the Pyronyl 101 insect repellent, 0.5 to 2.0 percent aqueous hydroxyethyl cellulose solution, 0.1 percent of an alkylaryl polyether alcohol non-ionic wetting agent, and 4 to 15 percent of an anti-migration ingredient to retard the loss of the insecticide from the treated fabric on exposure or storage. the insecticide-loss retarding ingredients used in these insect repellent formulations to treat the fabric samples contained longer chain unsaturated fatty acid ester groups, or hydroxyl groups, or both, and others containing no such groupings, such as silicone oil. The ingredients included bodied linseed oil, water dispersible linseed oil, tung oil, oxidized castor oil (27 stokes viscosity), ricinoleyl ricinoleate, ethyleneglycol monoricinoleate, propyleneglycol monoricinoleate, pentaerythritol monoricinoleate, pentaerythritol tetraricinoleate, glycerol monoricinoleate, polypropylene triol, polypropylene pentol, and silicone oil (350 centistokes). The insect repellent loss retarding ingredient, the insect repellent Pyronyl 101 and the aqueous hydroxyethyl cellulose solution concentrations in each treating formulation were chosen so that at about a 40 percent wet pickup about 3 percent by weight of the loss retarding ingredient was deposited on the fabric, and about 6 mg of pyrethrins and 60 mg of piperonyl butoxide would be deposited per square foot on the treated fabric. The treated fabrics, after drying containing the amounts of anti-migration ingredients and insecticide shown in Table II.

The treated fabrics were evaluated for ability to inhibit loss of the insect repellent by exposure in a forced draft oven at 50°C for several days. The piperonyl butoxide contents of the treated fabrics after such evaluations are given in Table 2, also. It is observed that those ingredients containing the unsaturated or hydroxy groupings resulted in less insecticide loss from the treated fabrics (from about 51 to 83 percent after 8 days exposure) than did the control (no additive to inhibit such loss) (35 percent after 8 days) or the wax containing treated fabric (only 60 percent after only 5 days), or the silicone oil containing treated fabric (35 percent after 8 days).

The above examples clearly demonstrate that incorporation of the aforementioned components into the insect repellent formulations used to treat fabric is instrumental in retarding the loss of the insect repellent from the treated fabrics with time as occurs when such inhibiting components are not present in the treating formulations.

To further illustrate the ability of these type components to retard loss of insecticide from IRT-fabric under more rigorous conditions than the extended heat exposure test described previously, speciments of IRT-cotton fabrics were exposed at 50°C in the forced draft oven in contact with an oil-containing cereal grain food as would be stored and transported in such IRT-textile food bags. The presence of the oil constituent in the food tends to contribute to migration of the insect repellent from the treated fabric into the oily phase of the food product. Such an effect is illustrated by the following examples.

Example 9

Retention of Insect Repellent in Cotton Fabric, treated with IRT-Formulation Containing Castor Oil, or Polyalkylene Glycol Textile Lubricant, or Wax as

TABLE II

RETENTION OF PIPERONYL BUTOXIDE IN COTTON FABRIC TREATED WITH
INSECT REPELLENT FORMULATIONS CONTAINING COMPONENTS TO RETARD
LOSS AND MIGRATION OF INSECTICIDE AFTER EXPOSURE IN 50°C FORCED DRAFT OVEN

| Component to Inhibit IR-Loss | | Piperonyl Butoxide Content of Fabric | | | |
|---|---|---|---|---|---|
| Name | Concentration on Treated Fabric | Original Content of IRT-Fabric | % Remaining After 50°C Exposure for | | |
| | | | 5 days | 7–8 days | 10 days |
| | Wt % | mg/sq ft | mg/sq ft | | |
| Blown Castor Oil (27 centistokes visc.) | 3.1 | 505 | 58 | | 50 |
| Bodied Linseed Oil | 2.0 | 340 | 61 | 68 | 61 | — |
| Water Dispersible Linseed Oil | 2.0 | 365 | 59 | 63 | 53 | — |
| Tung Oil | 1.9 | 315 | 58 | 59 | 51 | — |
| Ricinoleyl Ricinoleate | 2.7 | 450 | 63 | — | 81 | 74 |
| Ethyleneglycol monoricinoleate | 3.2 | 540 | 63 | — | 83 | 76 |
| Propyleneglycol monoricinoleate | 3.0 | 500 | 60 | — | 80 | 73 |
| Pentaerythritol monoricinoleate | 3.2 | 540 | 63 | — | 80 | 68 |
| Pentaerythritol tetraricinoleate | 3.0 | 490 | 62 | — | 77 | 68 |
| Polypropylene Triol | 3.0 | 535 | 69 | 79 | 80 | — |
| Polypropylene Pentol | 3.0 | 500 | 55 | 83 | — | 57 |
| Silicone Oil (Dow Corning 200 Fluid 350 cs. visc.) | 3.0 | 500 | 57 | 52 | 39 | — |
| None (control) | 0 | 0 | 56 | 55 | 35 | 25 |

Migration Retarders, When in Contact with Oil-Containing Food.

Cotton sheeting was padded with the following emulsified insect repellent formulation (A) 13.2 parts (3.3 percent) Pyronyl 101 Insect repellent preparation, 0.4 parts (0.1 percent) of an alkylaryl polyether alcohol wetting agent, 2.0 parts (0.5 percent) hydroxyethyl cellulose, and 384.4 parts (96.1 percent) water. Other fabric samples were treated with comparable insect repellent emulsions in which the water portion of formulation (A) was replaced by an additive component to inhibit insect repellent loss from the IRT-fabrics the water portion varied to yield these new formulations: formulation (B) used 47.6 parts (11.9 percent) of a 56 percent solids wax emulsion preparation and 84.2 percent water; formulation (C) used 26.6 parts (6.7 percent) of castor oil and 89.4 percent water; and formulation (D) used 16.0 parts (4.0 percent) of a polyalkylene glycol (visc. 56.2 centistokes at 100°F) textile lubricant, and 92.1 percent water.

The insect repellent formulations were prepared by vigorously mixing the insect repellent and additive component, if any, with the solution of hydroxyethyl cellulose and the non-ionic wetting agent in the water portion. The fabrics were padded to about a 75 percent wet pickup, and then air or oven dried. The treated fabrics contained the amounts of piperonyl buroxide and additive components as shown in Table III.

IRT-specimens from cotton fabrics treated with formulations A, B, C, and D, respectively, were each placed in separate test containers in contact with regular cornmeal (oil content about 1.03 percent), in which a ratio of fabric area to food weight was approximately the same as that of a 100-pound bag of the food. The containers were designed to allow the cornmeal to rest on the treated fabric while permitting free access of air from the opposite side of the treated fabric into the stored food. Specimens of each of the above IRT-fabrics in such a food container were placed in a covered container and held in a 50°C forced draft oven for extended time of accelerated storage. After a desired exposure period the containers were removed and the fabric sample and cornmeal analyzed for piperonyl butoxide contents and the results as indicated in Table III. After about 38 days in the 50°C oven test the following was observed: with the control IRT-fabric (formulation A) the piperonyl butoxide content of the fabric was only 5.2 percent whereas the cornmeal was 85 percent; with the wax containing IRT-fabric (formulation B) the piperonyl butoxide content of the fabric was only 5.1 percent whereas the cornmeal was 87 percent; with the castor oil containing IRT-fabric (formulation C) the piperonyl butoxide content of the fabric was still 38 percent while the cornmeal was 63 percent; and with the polyalkylene glycol textile lubricant IRT-fabric (formulation D) the piperonyl butoxide content of the fabric was 15 percent whereas the corn meal was 74 percent. Thus it is apparent that the IRT-fabric treated with the formulation C (containing castor oil) and formulation D (containing the textile lubricant) inhibited the loss of the insect repellent from the treated fabrics to the food product during storage.

Example 10

Retention of Insect Repellent in Cotton Fabric Treated with IRT-formulations Containing Unsaturated, or Hydroxy, or Ester Anti-Migration Components When in contact with Oil-Containing Foods.

Other cotton sheeting fabrics were insect repellent treated with insect repellent formulations prepared similar to those described in Example 8 but containing other components to retard loss of insect repellent from the treated fabrics when in contact with food products such as cornmeal. These antimigration components consisted of substances which contained unsaturated groups, or hydroxyl groups, or ester groups or combinations of these groups. The insect repellent treatments were applied to the fabrics by padding or coating the emulsified formulations at an appropriate wet pickup and subsequent drying as described in the previous examples. After the treatments the concentration of the insect repellent and the antimigration components in the treated fabrics were as listed in Table IV.

TABLE III

RETENTION OF PIPERONYL BUTOXIDE IN COTTON FABRIC TREATED WITH
INSECT REPELLENT FORMULATIONS CONTAINING COMPONENTS TO RETARD
LOSS AND MIGRATION OF INSECTICIDE AFTER EXPOSURE IN CONTACT
WITH CORNMEAL IN A 50° FORCED DRAFT OVEN

| Formulation | Component to Inhibit IR-Loss | | Piperonyl Butoxide Content | | |
|---|---|---|---|---|---|
| | Name | Concentration on treated fabric | Original content of IRT-fabric | % of Original remaining after 50°C exposure test for 38 days in Fabric:cornmeal | |
| | | wt.%  mg/sq ft | mg/sq ft | | |
| A | None (control) | 0        0 | 39 | 5.2 | 85 |
| B | Wax | 5      840 | 32 | 5.1 | 87 |
| C | Castor Oil | 5      840 | 50 | 38 | 63 |
| D | Polyalkylene glycol | 3      500 | 40 | 15 | 74 |

TABLE IV

RETENTION OF PIPERONYL BUTOXIDE IN COTTON FABRIC TREATED WITH INSECT REPELLENT FORMULATIONS CONTAINING COMPONENTS TO RETARD LOSS AND MIGRATION OF INSECTICIDE AFTER EXPOSURE IN CONTACT WITH CORNMEAL IN A 50°C FORCED DRAFT OVEN

| Component to Inhibit IR-Loss | | Piperonyl Butoxide Content | | |
|---|---|---|---|---|
| Name | Concentration on treated fabric | Original content of IRT-fabric | % of Original remaining after 50°C exposure test for 14 days in | |
| | | | fabric | cornmeal |
| | wt.% mg/sq ft | mg/sq ft | | |
| None (control) | 0    0 | 51 | 23 | 56 |
| Polyalkylene glycol Textile lubricant | 5.3   900 | 107 | 48 | 43 |
| Polypropylene glycol, 2025 MW | 5.1   860 | 102 | 52 | 31 |
| Polypropylene glycol, 1025 MW | 4.3   740 | 90 | 48 | 41 |
| Castor Oil | 6.0   1000 | 91 | 57 | 32 |
| Castor Oil | 8.3   1400 | 82 | 64 | 26 |
| Ricinoleyl Alcohol | 4.8   780 | 72 | 53 | 44 |
| Ricinoleic Acid | 3.8   650 | 66 | 62 | 38 |
| Ethyleneglycol monoricinoleate | 4.7   780 | 66 | 71 | 31 |
| Propyleneglycol monoricinoleate | 5.0   850 | 64 | 69 | 33 |
| Pentaerythritol monoricinoleate | 5.0   840 | 67 | 65 | 34 |
| Pentaerythritol tetraricinoleate | 4.3   720 | 70 | 62 | 29 |
| Oleic Acid | 5.0   840 | 75 | 61 | 38 |
| Linoleic Acid Dimer | 4.5   750 | 58 | 61 | 34 |
| Linoleic Acid Trimer | 4.5   750 | 65 | 55 | 34 |

Specimens of the treated fabrics were placed in contact with regular grade cornmeal in testing containers and stored in a forced draft oven at 50°C, as described in Example 8. After 14 days of storage the concentration of piperonyl butoxide in the treated fabric samples and in the cornmeal layers were as given in Table IV, which showed that all the IRT-fabrics treated with IR-formulations containing a component to retard loss of insect repellent had retained greater amounts of the insect repellent and permitted less of the insect repellent to migrate to the cornmeal than did the IRT-fabrics treated with IR-formulation that did not have such insect repellent loss retarding components incorporated into said formulations.

We claim:

1. A process for retarding pyrethrin and piperonyl butoxide insect repellent contamination of foodstuffs stored in contact with cellulosic textile containing said repellent, the process comprising:
   a. impregnating said textile to the extent of about 30 to 80 weight percent wet pickup with a formulation having
      1. about from 1 to 10 percent of a petroleum distillate solution of from 1.2 to 5 percent pyrethrins, 12 to 50 percent piperonyl butoxide, and 12 to 20 percent of polyoxyethylene sorbitol ester of mixed $C_{12}$ fatty acid
      2. about from 1 to 14 percent of an antimigrating agent selected from the group consisting of
         water soluble polyalkylene glycol,
         polypropylene triol of average molecular weight 700,
         polypropylene pentol of average molecular weight 400,
         ethylene glycol monoricinoleate,
         pentaerythritol monoricinoleate,
         corn oil,
         tung oil,
         linseed oil,
         oleic acid,
         linoleic acid dimer, and
         linoleic acid trimer; and
      3. about 70 to 95 percent of a 0.2 to 2.0 percent aqueous hydroxyethyl cellulose thickener solution; and
   b. drying the wet impregnated cellulosic textile.

2. The process of claim 1 wherein the textile is fabricated into packaging material.

3. The process of claim 1 wherein the formulation also includes about from 0.1 percent to 0.5 percent of a non-ionic alkylaryl polyether alcohol wetting agent.

4. A composition for treating food packaging materials, said composition having 1. about from 1 to 10 percent of a petroleum distillate solution of from 1.2 to 5 percent pyrethrins, 12 to 50 percent piperonyl butoxide, and 12 to 20 percent of polyoxyethylene sorbitol ester of mixed $C_{12}$ fatty acids, 2. about from 1 to 14 percent of a antimigrating agent selected from the group consisting of
      water soluble polyalkylene glycol,
      polypropylene triol of average molecular weight 700,
      polypropylene pentol of average molecular weight 400,
      ethylene glycol monoricinoleate,
      pentaerythritol monoricinoleate, corn oil,
tung oil,
linseed oil,
oleic acid,
linoleic acid dimer, and
linoleic acid trimer; and 3. about 70 to 95 percent of a 0.2 to 2.0 percent aqueous hydroxyethyl cellulose thickener solution.

5. The composition of claim 4 wherein the formulation also includes about from 0.1 to 0.5 percent of a non-ionic alkeylaryl polyether alcohol wetting agent.

* * * * *